(12) United States Patent
Jones

(10) Patent No.: US 10,488,291 B2
(45) Date of Patent: Nov. 26, 2019

(54) PORTABLE APPLIANCE TESTING APPARATUS

(71) Applicant: A.T.U., Inc., Nampa, ID (US)

(72) Inventor: Dustin Jones, Nampa, ID (US)

(73) Assignee: A.T.U., INC., Nampa, ID (US)

( * ) Notice: Subject to any disclaimer, the term of this patent is extended or adjusted under 35 U.S.C. 154(b) by 353 days.

(21) Appl. No.: 15/470,569

(22) Filed: Mar. 27, 2017

(65) Prior Publication Data

US 2018/0275007 A1    Sep. 27, 2018

(51) Int. Cl.
G01M 3/02 (2006.01)
G01D 21/02 (2006.01)
G01M 99/00 (2011.01)
G01R 31/02 (2006.01)
G01M 3/28 (2006.01)
G01M 3/32 (2006.01)
G01M 3/26 (2006.01)

(52) U.S. Cl.
CPC .............. *G01M 3/02* (2013.01); *G01D 21/02* (2013.01); *G01M 3/26* (2013.01); *G01M 3/28* (2013.01); *G01M 3/2807* (2013.01); *G01M 3/2815* (2013.01); *G01M 3/2853* (2013.01); *G01M 3/2869* (2013.01); *G01M 3/3209* (2013.01); *G01M 3/3254* (2013.01); *G01M 3/3263* (2013.01); *G01M 3/3272* (2013.01); *G01M 99/005* (2013.01); *G01M 99/008* (2013.01); *G01R 31/025* (2013.01)

(58) Field of Classification Search
CPC ... G01R 31/02; G01R 31/025; G01M 99/005; G01M 99/008; G01M 3/02; G01M 3/2853; G01M 3/2869; G01M 3/06; G01M 3/28; G01M 3/2807; G01M 3/2815; G01M 3/32; G01M 3/3209; G01M 3/3254; G01M 3/3263; G01M 3/3272
See application file for complete search history.

(56) References Cited

U.S. PATENT DOCUMENTS

| | | | |
|---|---|---|---|
| 2005/0045751 A1* | 3/2005 | Nance | B08B 9/0433 239/587.1 |
| 2006/0196251 A1* | 9/2006 | Richey | G01M 3/2815 73/49.1 |
| 2011/0101780 A1* | 5/2011 | Johnson | H01M 2/1022 307/66 |

FOREIGN PATENT DOCUMENTS

WO    WO2006131938 A1    12/2006

OTHER PUBLICATIONS

European Patent Office; International Search Report and Written Opinion; International Application No. PCT/US2017/035023 dated Jan. 29, 2018.

* cited by examiner

*Primary Examiner* — Paul M. West
(74) *Attorney, Agent, or Firm* — Parsons Behle & Latimer

(57) ABSTRACT

A portable appliance testing apparatus includes a water tank and a pump configured to draw water from the water tank and pressurize the water within a piping assembly. The apparatus further includes a pressure regulator switch coupled to the piping assembly to enable control of the pump based on a pressure within the piping assembly. The apparatus also includes at least one appliance connector coupled to the piping assembly to enable attachment of an appliance thereto.

17 Claims, 7 Drawing Sheets

PORTABLE APPLIANCE TESTING APPARATUS

FIELD OF THE DISCLOSURE

This disclosure is generally related to the field of appliance testing, and more particularly to appliance testing with a self-contained portable appliance testing apparatus.

BACKGROUND

When a customer returns an appliance, such as a refrigerator, a washing machine, a dryer, an ice machine, or a dishwasher, to a retail store, the store will typically perform tests to ensure that the appliance is functioning properly before reselling the appliance. When the appliance includes water and electrical systems, the appliance is installed in a plumbing and electrical system for testing.

Floor locations on which the returned appliances are shown and stored generally do not include adequate hookups for testing the returned appliance. For example, appliance retailers typically do not have water systems available for testing the appliances. Likewise, the physical building may not have sufficient plumbing capacity or electrical capacity to conduct extensive appliance testing. In particular, when multiple appliances must be tested, the physical building must have a sufficient number of connectors and electrical outlets to accommodate the multiple appliances. Otherwise, each individual appliance must be installed, tested, and uninstalled one at a time, representing a significant draw on the time and resources of the retail store.

As such, when multiple appliances must be tested, retail stores will typically have the appliances shipped to a testing facility that has sufficient plumbing and electrical capacity to test at least some of the machines simultaneously. However, shipping the appliances also takes a significant amount of time and resources. What is needed is a way to test appliances quickly and efficiently, without shipping them to separate testing facilities.

SUMMARY

Disclosed is a self-contained and portable apparatus for testing appliances. The apparatus may be used to test washing machines, steam dryers, refrigerators, dishwashers, ice machines, etc. The apparatus includes a water tank, a pump to draw water from the water tank and pressurize the water, and one or more appliance connectors to feed the pressurized water to one or more appliances. Return water may be received back in the water tank.

In an embodiment, a portable appliance testing apparatus includes a water tank. The apparatus further includes a pump configured to draw water from the water tank and pressurize the water within a piping assembly. The apparatus also includes a pressure regulator switch coupled to the piping assembly to enable control of the pump based on a pressure within the piping assembly. The apparatus includes at least one appliance connector coupled to the piping assembly to enable attachment of an appliance thereto.

In some embodiments, the apparatus includes an electrical outlet and a power breaker to provide electrical power to the electrical outlet and to prevent overcurrent at the electrical outlet. In some embodiments, a voltage potential provided to the electrical outlet by the power breaker is selected from the group consisting of a standard 220 V potential, a standard 110 V potential, a commercial 208 V potential, and a commercial 120 V potential. In some embodiments, the apparatus includes a second electrical outlet, where the electrical outlet is wired to receive a standard 220 V potential from the power breaker, and where the second electrical outlet is wired in a split configuration to receive a standard 110 V potential from the power breaker. In some embodiments, the apparatus includes a return access inlet to enable the receipt of return water from an appliance into the water tank.

In some embodiments, the apparatus includes a filter assembly coupled to the water tank and configured to filter return water from the appliance when the return water is received into the water tank. In some embodiments, the apparatus includes a filter assembly coupled to the pump and configured to filter the water before the water passes into the piping assembly. In some embodiments, the apparatus includes a gauge to indicate the pressure within the piping assembly. In some embodiments, the piping assembly includes a pressure tank to stabilize the pressure within the piping assembly. In some embodiments, the appliance connector is selected from the group consisting of a washing machine water connector, a dishwasher connector, a dryer connector, an ice machine, and a refrigerator water connector.

In some embodiments, the apparatus includes a second appliance connector coupled to the piping assembly to enable attachment of a second appliance thereto. In some embodiments, the apparatus includes a second pump configured to draw water from the water tank and pressurize the water within a second piping assembly, and a second appliance connector coupled to the second piping assembly to enable attachment of a second appliance thereto. In some embodiments, the apparatus includes a water sprayer mounted within the water tank and configured to wash an inside of the water tank.

In an embodiment, a portable appliance testing apparatus includes a water tank. The apparatus further includes a pump configured to draw water from the water tank and pressurize the water within a piping assembly. The apparatus also includes an appliance connector coupled to the piping assembly to enable attachment of an appliance thereto. The apparatus includes a return access inlet to enable the receipt of return water from the appliance into the water tank.

In some embodiments, the apparatus further includes an electrical outlet to enable electrical attachment of the appliance, and a power breaker to provide electrical power to the electrical outlet and to prevent overcurrent at the electrical outlet. In some embodiments, the apparatus also includes a pressure regulator switch coupled to the piping assembly to enable control of the pump based on a pressure within the piping assembly. In some embodiments, the apparatus includes additional appliance connectors coupled to the piping assembly to enable attachment of additional appliances thereto. In some embodiments, the apparatus includes a pressure tank to stabilize the pressure within the piping assembly.

In an embodiment, a method for appliance testing includes drawing water from a water tank with a pump and pressurizing the water within a piping assembly. The method further includes controlling the pump based on a pressure within the piping assembly with a pressure regulator switch coupled to the piping assembly. The method also includes passing the water to an appliance attached to the piping assembly via an appliance connector coupled to the piping assembly. The method includes receiving return water from the appliance into the water tank via a return access inlet. In some embodiments, the method further includes passing water to a second appliance attached to the piping assembly via a second appliance connector coupled to the piping assembly.

BRIEF DESCRIPTION OF THE DRAWINGS

FIG. 3 depicts the apparatus from a first angle, FIG. 4 depicts the apparatus from a second angle, and FIG. 5 depicts the apparatus from a third angle.

FIG. 10 depicts the apparatus from a first angle and FIG. 11 depicts a portion of the apparatus from a second angle.

Figure 1:
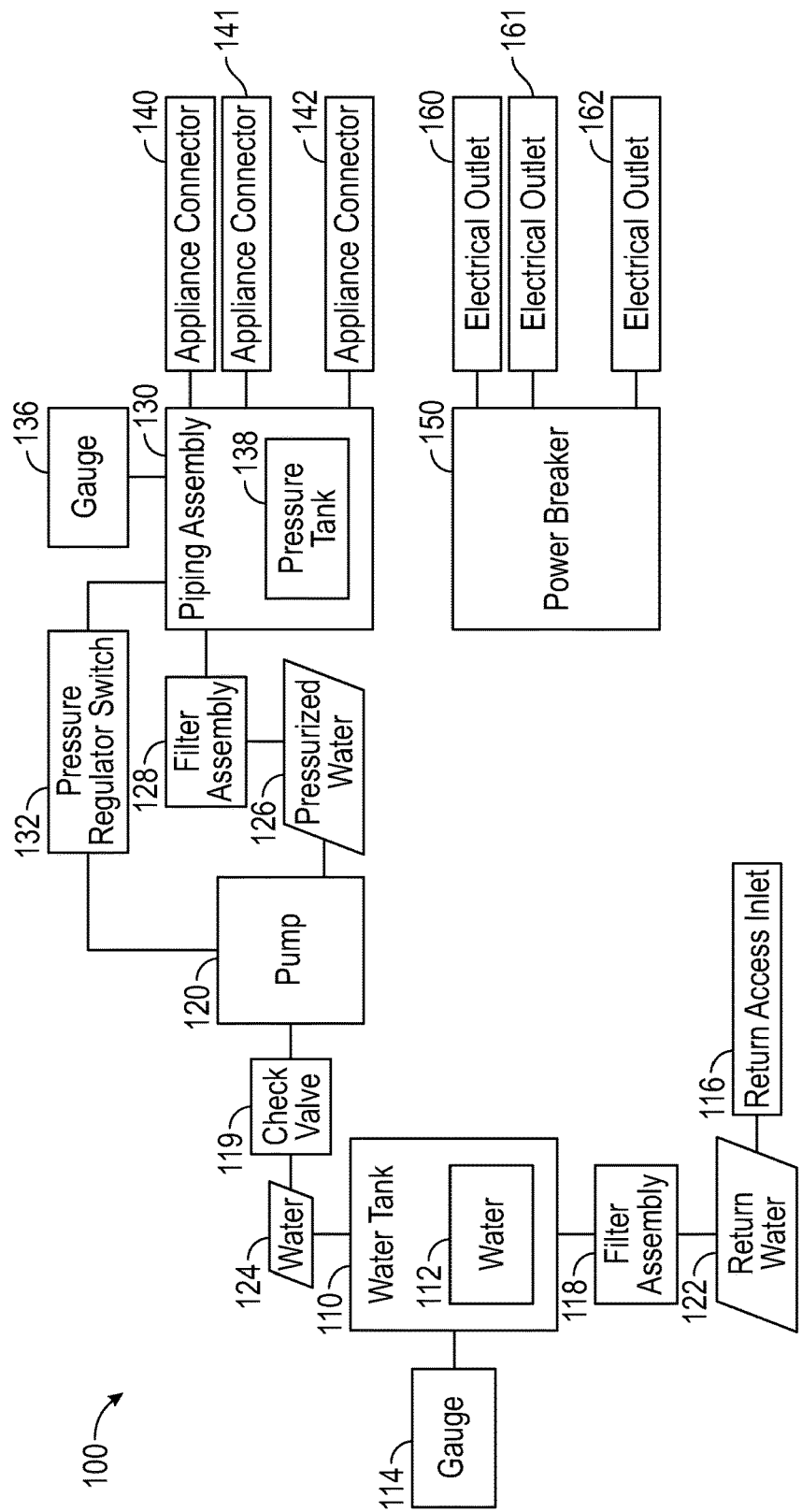
FIG. 1 is a block diagram of an embodiment of an apparatus for appliance testing.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents, and alternatives falling within the spirit and scope of the disclosure.

DETAILED DESCRIPTION

Referring to FIG. 1, a block diagram of an embodiment of an apparatus 100 for appliance testing is depicted. The apparatus, 100 may include a water tank 110, a pump 120, a piping assembly 130, and a power breaker 150.

The water tank 110 may act as a reservoir for water 112 to be used by the apparatus 110. In some embodiments, the water tank 110 may have at least a 250 gallon water storage capacity. The water tank 110 may also include a gauge 114 to indicate an amount or level of the water 112. The gauge 114 enables a user of the apparatus 100 to maintain sufficient water within the water tank 110 to perform tests on an appliance or appliances. However, some embodiments may omit the gauge 114 and a user may rely on other means for determining the amount or level of the water 112.

The water tank 110 may also include a return access inlet 116 for receiving return water 122 from an appliance under test (not shown). In some embodiments, the return access inlet 116 may be an opening defined within a surface of the water tank 110. In other embodiments the return access inlet 116 may include a washer box or another type of fluid input mechanism.

A filter assembly 118 may be coupled to, or incorporated within, the water tank 110 to receive and filter the return water 122 before the return water 122 is added to the water 112 within the water tank 110. The filter assembly 118 may be configured to remove dirt particles or debris from the water that might clog or otherwise damage the apparatus 100. Some embodiments may exclude the filter assembly 118. In some embodiments, the filter assembly 118 may include multiple filters.

The pump 120 may draw water 124 from the water tank 110 to create pressurized water 126 which is fed into the piping assembly 130. A check valve 119 may be positioned between the pump 120 and the water tank 110 to prevent water from flowing from the pump 120 into the water tank 110. In some embodiments, the check valve 119 may be omitted.

A filter assembly 128 may be positioned between the pump 120 and the piping assembly 130 to filter the pressurized water 126. Filtering the pressurized water 126 may help protect an appliance under test (not shown) from any dirt particles or debris introduced into the pressurized water 126 while in the water tank 110 or by the pump 120. Some embodiments, as described herein, may omit the filter assembly 128. In some embodiments, the filter assembly 118 may include multiple filters.

In order to maintain constant pressure within the piping assembly 130, a pressure regulator switch 132 may be coupled to the piping assembly 130. The pressure regulator switch 132 may further be electrically coupled to the pump 120 to enable control of the pump 120 based on a pressure within the piping assembly 130. A gauge 136 may provide a user with an indication of the pressure within the piping assembly 130 enabling the user to reconfigure the pressure regulator switch 132 if needed. In an embodiment, the pressure regulator switch 132 is configured to maintain a pressure of approximately 50 psi within the piping assembly 130. As used herein approximately 50 psi means that the pressure is within a threshold of 50 psi, where the threshold is determined by the capacity of the pump 120, the sensitivity of the pressure regulator switch 132, and the amount of water drawn by one or more attached appliance(s).

To further maintain constant pressure, in some embodiments, a pressure tank 138 may be coupled to, or incorporated into, the piping assembly 130 to resist sudden changes in pressure. However, depending on a number of appliances under test, the pressure within the piping assembly 130 may be sufficiently maintained without the pressure tank 138. As such, some embodiments may omit the pressure tank 138.

The piping assembly 130 may be fitted with a set of one or more appliance connectors 140-142. For example, the apparatus 100 may include a first appliance connector 140, a second appliance connector 141, and a third appliance connector 142. However, this is for example purposes only. Other embodiments may include more or fewer than three appliance connectors.

The power breaker 150 may be a standard 220 V power breaker, a standard 110 V power breaker, a commercial 208 V power breaker, a commercial 120 V power breaker, or another type of power breaker, and may be fitted with a set of one or more electrical outlets 160-162. For example, the apparatus 100 may include a first electrical outlet 160, a second electrical outlet 161, and a third electrical outlet 162. The power breaker 150 may prevent overcurrent at the electrical outlets 160-162. A voltage potential provided to the set of one or more electrical outlets 160-162 by the power breaker 150 may be selected from the group consisting of a standard 220 V potential, a standard 110 V potential, a standard 240 V potential, commercial 208 V potential, and commercial 120 V potential. As used herein, a standard voltage potential includes a range of voltage potentials applied to typical households and may not be exactly 110 V or 220 V.

In some embodiments, the power breaker 150 may be a 220 V power breaker and a first electrical outlet (e.g., the electrical outlet 160) may be wired to receive a standard 220 V potential from the power breaker 150, while a second electrical outlet (e.g., the electrical outlet 161) may be wired in a split configuration to receive a standard 110 V potential from the power breaker 150. Additional electrical outlets (e.g., the electrical outlet 162) may be wired either for a standard 220 V potential or a standard 110 V potential. Although FIG. 1 shows three electrical outlets 160-162, this is for example purposes only. Other embodiments may include more or fewer than three electrical outlets.

Further, in some embodiments, the power breaker 150 may be omitted and power may be provided directly to the set of one or more electrical outlets 160-162. In these embodiments, other methods of overcurrent protection may be employed.

During operation, the pump 120 may draw water 124 from the water tank 110 and pressurize the water 124 within the piping assembly 130. The pressure regulator switch 132 may sense the pressure within the piping assembly 130 and may control the pump 120 based on the pressure within the piping assembly 130. For example, if the pressure within the piping assembly 130 drops below a threshold pressure, the pressure regulator switch 132 may engage electrodes to activate the pump 120. Likewise, if the pressure within the piping assembly 130 exceeds a threshold pressure, the pressure regulator switch 132 may disengage the electrodes to deactivate the pump 120.

The pressurized water 126 within the piping assembly 130 may be passed to one or more appliances (not shown) attached to the piping assembly 130 via the set of appliance connectors 140-142 coupled to the piping assembly 130. After the pressurized water 126 has been processed by the one or more appliances, it may be received at the return access inlet 116 as the return water 122 and may be added to the water 112 within the water tank 110.

An advantage of the apparatus 100 is that by including a self-contained water and electrical system, an appliances may be tested without being installed at a plumbing and electrical system of a building. As such, the amount of time and resources devoted to testing the appliances may be reduced. Further, the appliance need not be transported to a separate testing facility to be tested. Also, by including the pressure regulator switch 132, constant pressure may be supplied to multiple appliances under test, as opposed to testing performed by installing the appliances in a standard plumbing and electrical system of a building or other fixed location, which may only include connectors for one appliance at a given location. Other benefits and advantages of the apparatus 100 may exist.

Figure 2:
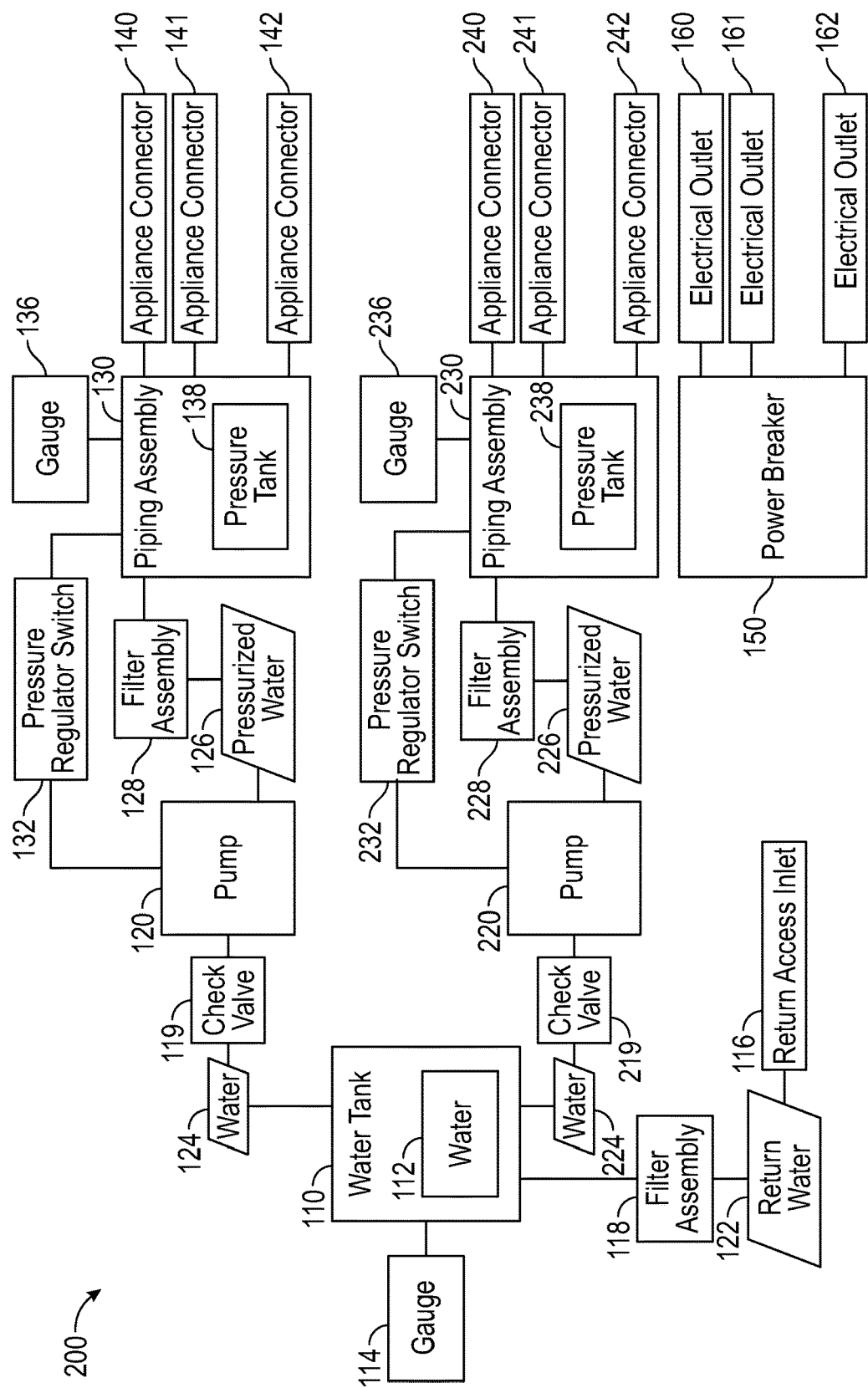
FIG. 2 is a block diagram of an embodiment of an apparatus for appliance testing.

Referring to FIG. 2, a block diagram of an embodiment of an apparatus 200 for appliance testing is depicted. The apparatus 200 may include a second pump 220 and a second piping assembly 230. The addition of the second pump 220 and the second piping assembly 230 may enable the apparatus 200 to test more appliances simultaneously than embodiments that omit the second pump 220 and the second piping assembly 230.

The second pump 220 may draw water 224 from the water tank 110 to create pressurized water 226 which is fed into the second piping assembly 230. Alternatively, the second pump 220 may draw water 224 from a second water tank (not shown) within the apparatus 200 or the water tank 110 of the apparatus 200 may be partitioned into two compartments (not shown) with the first pump 120 in communication with the first compartment and the second pump 220 in communication with the second compartment.

A check valve 119 may be positioned between the pump 120 and the water tank 110 to prevent water from flowing from the pump 120 into the water tank 110. Likewise, a check valve 219 may be positioned between the pump 220 and the water tank 110. In some embodiments, the check valve 119, the check valve 120, or both may be omitted. A second filter assembly 228 may be positioned between the second pump 220 and the second piping assembly 230 to filter the pressurized water 226. In some embodiments, the second filter assembly 230 may include multiple filters. Further, as with the filter assembly 128, some embodiments of the apparatus 200 may omit the second filter assembly 228.

In order to maintain constant pressure within the second piping assembly 230, a second pressure regulator switch 232 may be coupled to the second piping assembly 230. The second pressure regulator switch 232 may further be electrically coupled to the second pump 220 to enable control of the second pump 220 based on a pressure within the second piping assembly 230. A second gauge 236 may provide a user with an indication of the pressure within the second piping assembly 230.

In some embodiments, a second pressure tank 238 may be coupled to, or incorporated into, the second piping assembly 230 to resist sudden changes in pressure. Some embodiments may omit the second pressure tank 238.

The second piping assembly 230 may be fitted with a second set of one or more appliance connectors 240-242. For example, the second set of one or more appliance connectors 240-242 may include a first appliance connector 240, a second appliance connector 241, and a third appliance connector 242. However, this is for example purposes only. Other embodiments may include more or fewer than three appliance connectors within the second set of appliance connectors 240-242.

An advantage of the apparatus 200 is that more appliances may be coupled thereto and may draw water from the apparatus 200 without diminishing the pressure or capacity of the piping assembly 130 and the second piping assembly 230. As such, the apparatus 200 may be capable of reducing the amount of time required to test many appliances. Other benefits and advantages of the apparatus 200 may exist.

Figure 3:
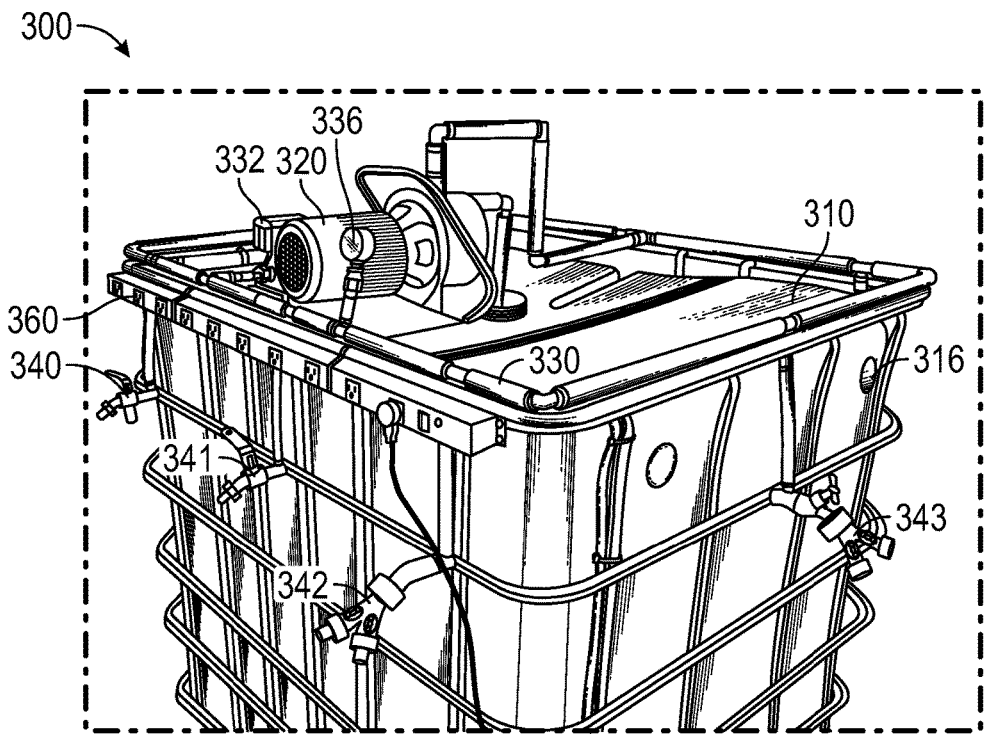
FIGS. 3-5 are illustrations of an embodiment of an apparatus for appliance testing from multiple angles.
Figure 4:
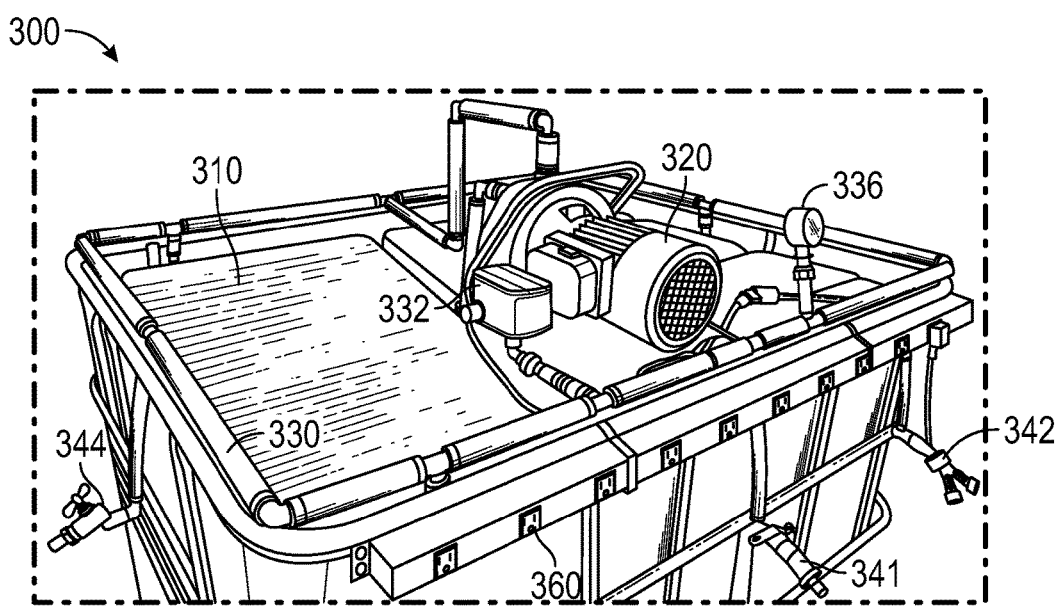
Figure 5:
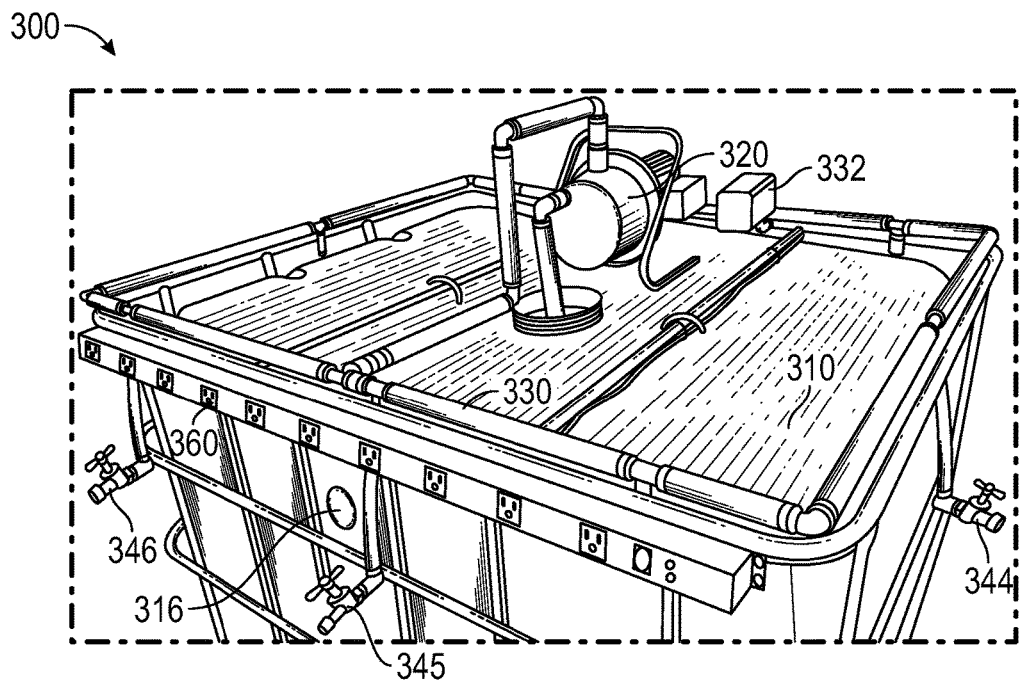

Referring to FIGS. 3-5, an illustration of an embodiment of an apparatus 300 for appliance testing is depicted. FIG. 3 depicts the apparatus 300 from a first angle, FIG. 4 depicts the apparatus 300 from a second angle, and FIG. 5 depicts the apparatus 300 from a third angle.

The apparatus 300 may include a water tank 310, a pump 320, a piping assembly 330, and multiple electrical outlets 360. The water tank 310 may include a return access inlet 316 for receiving return water from an appliance under test. In the embodiment of FIG. 3, the return access inlet 316 may be an opening defined within a surface of the water tank 110.

In order to maintain constant pressure within the piping assembly 330, a pressure regulator switch 332 may be coupled to the piping assembly 330. The pressure regulator switch 332 may further be electrically coupled to the pump 320 to enable control of the pump 320 based on a pressure within the piping assembly 330. A gauge 336 may provide a user with an indication of the pressure within the piping assembly 330 enabling the user to reconfigure the pressure regulator switch 332 if needed.

The piping assembly 330 may be fitted with a set of one or more appliance connectors 340-346. For example, the apparatus 300 may include a first appliance connector 340, a second appliance connector 341, a third appliance connector 342, a fourth appliance connector 343, a fifth appliance connector 344, a sixth appliance connector 345, and a seventh appliance connector 346. Additional appliance connectors (not shown) may also be attached to the piping assembly 330.

In the example embodiment depicted in FIGS. 3-5, filter assemblies are omitted from between the pump 320 and the piping assembly 330 and from the return access inlet 316. The example apparatus 300 also omits a pressure tank from the piping assembly 330. A gauge is omitted from the water tank 310 and a power breaker is omitted from the at least one electrical outlet 160. Other embodiments may include some or all of these features, as described herein.

Figure 6:
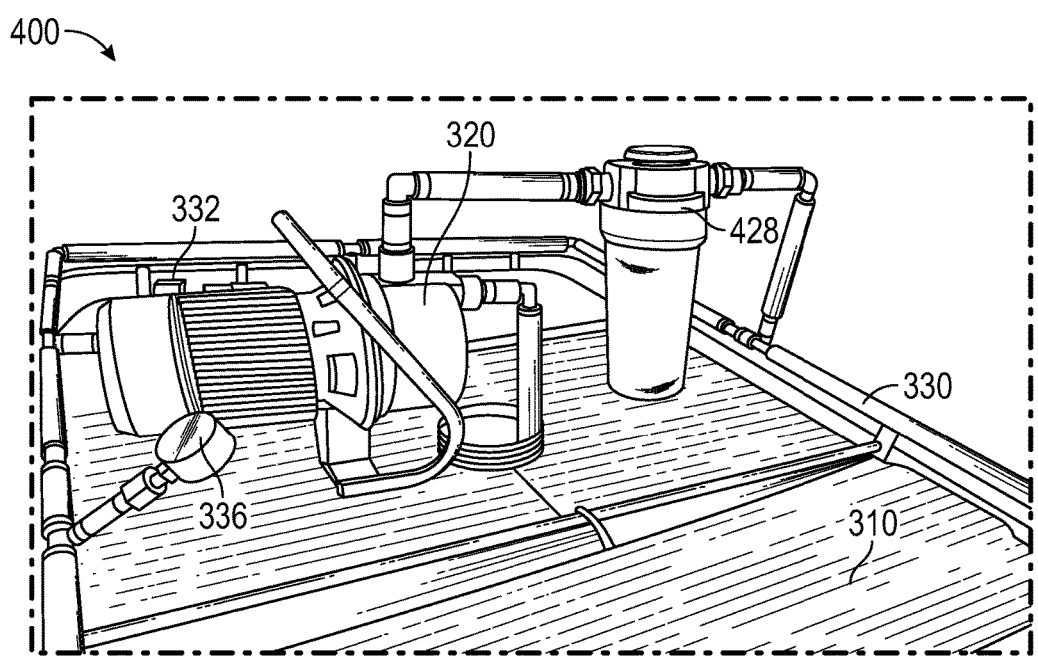
FIG. 6 is an illustration of an embodiment of an apparatus for appliance testing that includes a filter assembly.

Referring to FIG. 6, an illustration of an embodiment of an apparatus 400 for appliance testing is depicted. The apparatus 400 may include a filter assembly 428 positioned between the pump 332 and the piping assembly 330. The filter assembly 428 may help protect an appliance under test from any dirt particles or debris introduced into the pressurized water while in the water tank 310 or by the pump 320.

Figure 7:
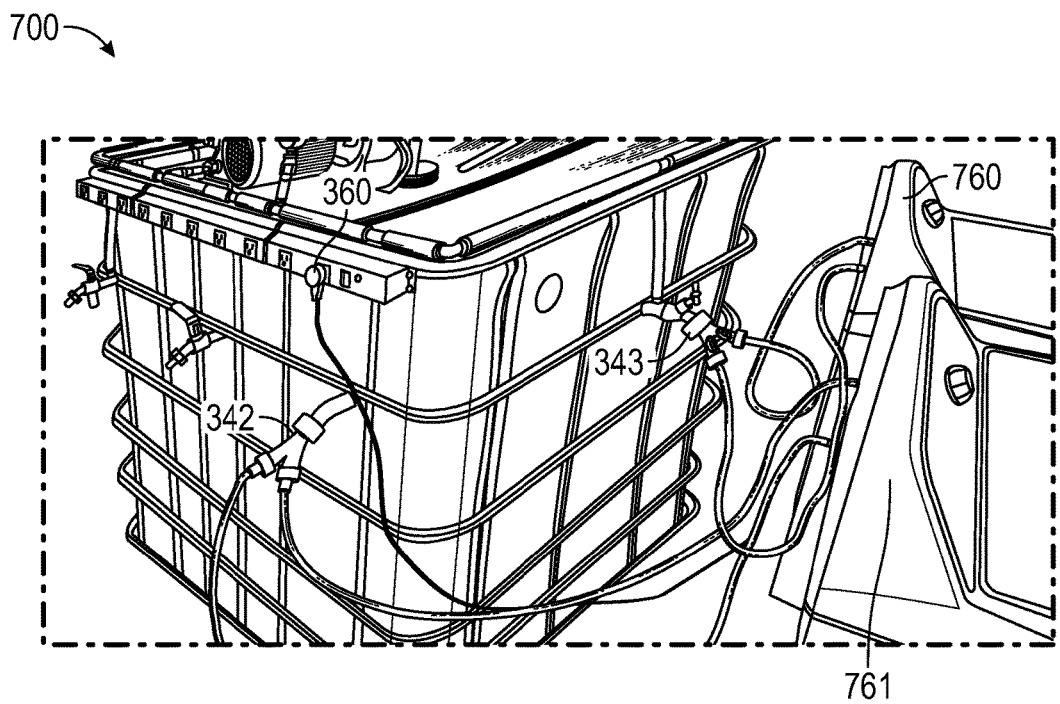
FIG. 7 is an illustration of an embodiment of an apparatus for appliance testing that is coupled to a first appliance and a second appliance.

Referring to FIG. 7, an illustration of an embodiment of an apparatus 700 for appliance testing is depicted. The apparatus 700 may be coupled to a first appliance 760 and a second appliance 761. For example, the first appliance 760 may be coupled to the fourth appliance connector 343 and the second appliance 761 may be coupled to the third appliance connector 342. Likewise, the first and second appliances 760, 761 may be electrically coupled to the multiple electrical outlets 360. In FIG. 7, the appliances are depicted as washing machines. Additional examples of appliances that may be coupled to the apparatus 700 include steam dryers, dishwashers, ice machines, and refrigerators. Other appliances may also be coupled to the apparatus 700. While only two appliances are depicted as coupled to the apparatus 700, more or fewer than two appliance may be coupled thereto.

Figure 8:
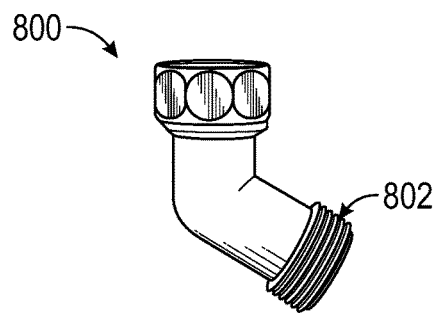
FIG. 8 is an illustration of an example of an appliance connector for use with any of the embodiments described herein.

Referring to FIG. 8, an illustration of an example of an appliance connector 800 for use with any of the embodiments described herein is depicted. In FIG. 8, the appliance connector 800 is a hose connector. For example, the appliance connector 800 may include a threaded portion 802 to enable attachment of a hose. This type of connector may be suitable for connecting to washing machines and steam dryers.

Figure 9:
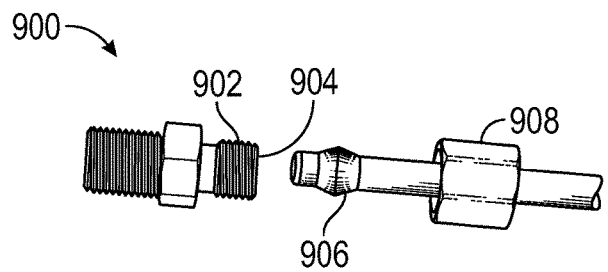
FIG. 9 is an illustration of an example of an appliance connector for use with any of the embodiments described herein.

Referring to FIG. 9, an illustration of an example of an appliance connector 900 for use with any of the embodiments described herein is depicted. In FIG. 9, the appliance connector 900 is a compression fitting. For example, the appliance connector 900 may include a threaded portion 902, a compression seat 904, a compression ring 906, and a compression nut 908. This type of connector may be suitable for connecting to dishwashers and refrigerators.

Figure 10:
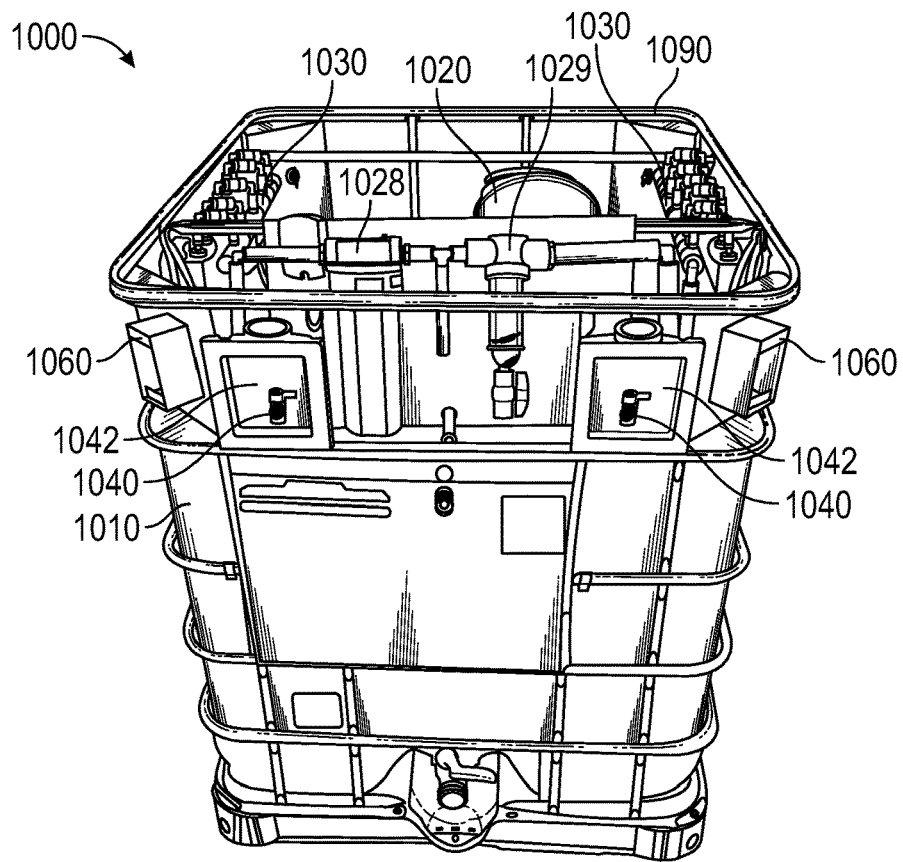
FIGS. 10 and 11 are illustrations of an embodiment of an apparatus for appliance testing from multiple angles.
Figure 11:
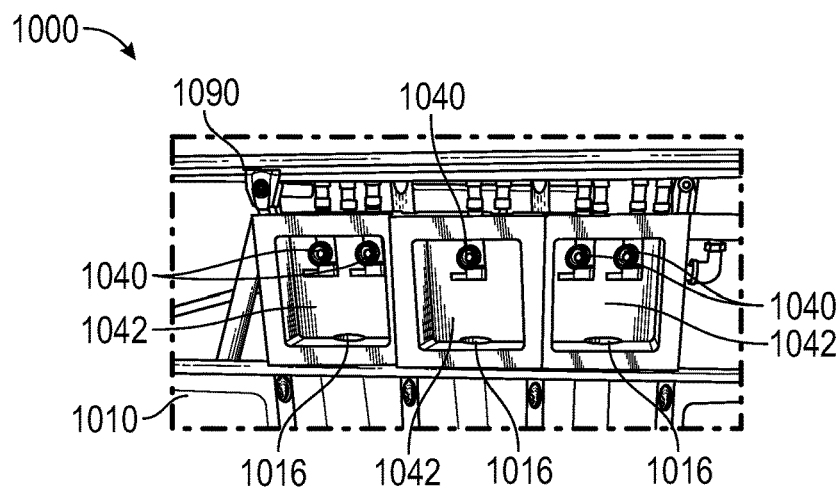

Referring to FIGS. 10 and 11, an illustration of an embodiment of an apparatus 1000 for appliance testing is depicted. FIG. 10 depicts the apparatus 1000 from a first angle, FIG. 11 depicts the apparatus 1000 from a second angle.

The apparatus 1000 may include a water tank 1010, a pump 1020, a piping assembly 1030, and multiple electrical outlets 1060. The elements of the apparatus 1000 may be coupled to, and incorporated within, a portable frame 1090. Further, the apparatus 1000 may include appliance connectors 1040 for attaching appliances to the apparatus 1000. The appliance connectors may be coupled to the frame 1090 via appliance boxes 1042.

In the embodiment depicted in FIG. 10, the apparatus includes multiple filters 1028, 1029 configured to filter water before the water is supplied to appliances. For example, a first filter 1028 may be a fine particle filter while the second filter 1029 may be a course particle filter. Other embodiments may exist.

As depicted in FIG. 11, the appliance boxes 1042 may include return access inlets 1042 for received water from appliances and returning the water to the water tank 1010. for receiving return water from an appliance under test. In the embodiment of FIG. 3, the return access inlet 316 may be an opening defined within a surface of the water tank 110.

Figure 12:
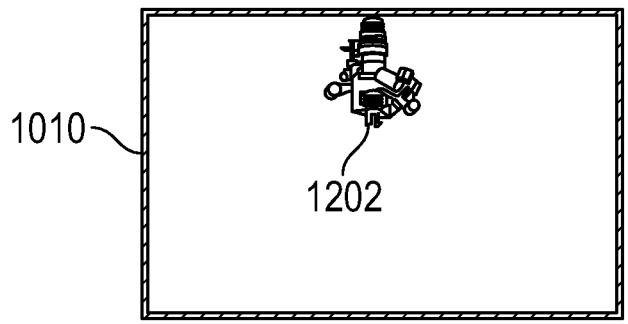
FIG. 12 is an illustration of an embodiment of a water tank for use with an apparatus for appliance testing.

Referring to FIG. 12, an embodiment of a water tank 1010 for use with the apparatuses disclosed herein is depicted. The water tank 1010 may include a water sprayer 1202. The water sprayer 1202 may be used to clean the water tank 1010 after one or more tests of appliances have been performed.

Figure 13:
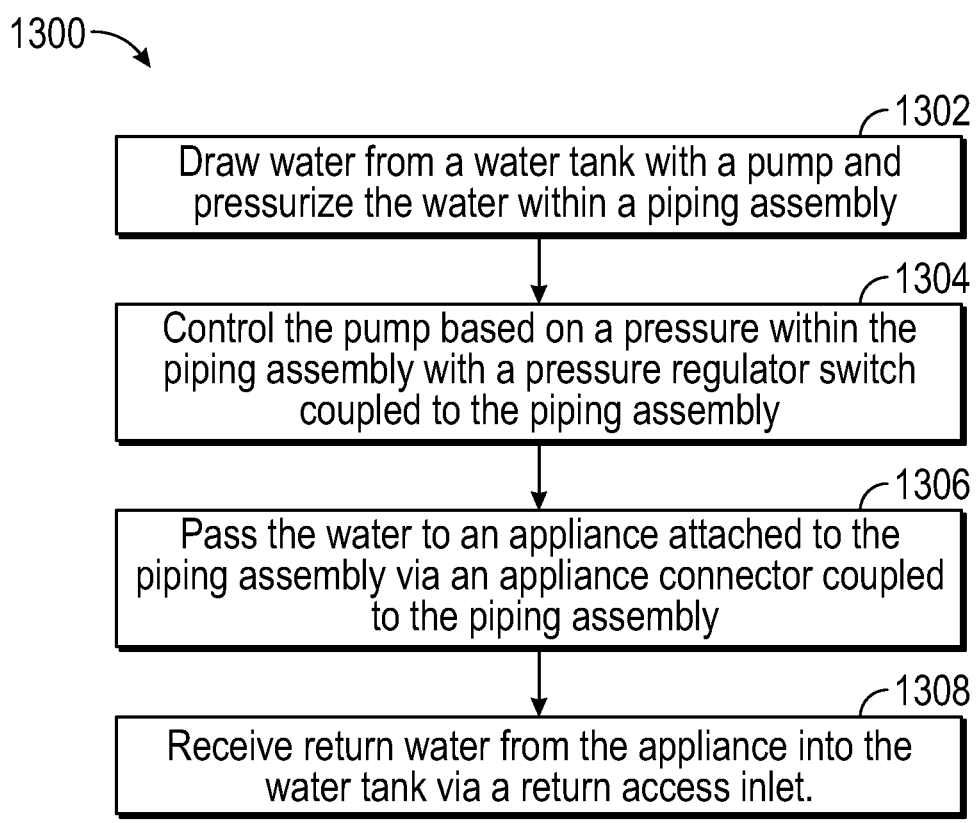
FIG. 13 is a flow chart of an embodiment of a method for appliance testing.

Referring to FIG. 13, a flow chart of an embodiment of a method 1100 for appliance testing is depicted. The method 1300 may include drawing water from a water tank with a pump and pressurizing the water within a piping assembly, at 1302. For example, the pump 120 may draw the water 124 from the water tank 110 and pressurize the water within the piping assembly 138.

The method 1300 may further include controlling the pump based on a pressure within the piping assembly with a pressure regulator switch coupled to the piping assembly, at 1304. For example, the pressure regulator 132 may control the pump 120 based on a pressure within the piping assembly 130.

The method 1300 may also include passing the water to an appliance attached to the piping assembly via an appliance connector coupled to the piping assembly, at 1306. For example, the pressurized water 126 may be passed to an appliance attached to the piping assembly 130 via one or more of the appliance connectors 140-142.

The method 1300 may include receiving return water from the appliance into the water tank via a return access inlet, at 1308. For example, the return water 122 may be received into the water tank 110 via the return access inlet 116.

An advantage of the method 1300 is that appliances may be tested without being installed at a plumbing and electrical system of a building. As such, the amount of time and resources devoted to testing the appliances may be reduced. Further, the appliance need not be transported to a separate testing facility to be tested. Also, by controlling the pump based on a pressure within the piping assembly, constant pressure may be supplied to multiple appliances under test, as opposed to methods in which testing is performed by installing the appliances in a standard plumbing and electrical system of a building or other fixed location, which may only include connectors for one appliance at a given location. Other benefits and advantages of the method 1300 may exist.

Although various embodiments have been shown and described, the present disclosure is not so limited and will be understood to include all such modifications and variations as would be apparent to one skilled in the art.

What is claimed is:

1. A portable appliance testing apparatus comprising:
a water tank;
a pump configured to draw water from the water tank and pressurize the water within a piping assembly;
a pressure regulator switch coupled to the piping assembly to enable control of the pump based on a pressure within the piping assembly;
at least one appliance connector coupled to the piping assembly to enable attachment of an appliance thereto;
an electrical outlet to enable electrical attachment of the appliance; and
a power breaker to provide electrical power to the electrical outlet and to prevent overcurrent at the electrical outlet.

2. The apparatus of claim 1, wherein a voltage potential provided to the electrical outlet by the power breaker is selected from the group consisting of a standard 220 V potential, a standard 110 V potential, a commercial 208 V potential, and a commercial 120 V potential.

3. The apparatus of claim 1, further comprising:
a second electrical outlet, wherein the electrical outlet is wired to receive a standard 220 V potential from the power breaker, and wherein the second electrical outlet is wired in a split configuration to receive a standard 110 V potential from the power breaker.

4. The apparatus of claim 1, further comprising:
a return access inlet to enable the receipt of return water from an appliance into the water tank.

5. The apparatus of claim 1, further comprising a filter assembly coupled to the water tank and configured to filter return water from the appliance when the return water is received into the water tank.

6. The apparatus of claim 1, further comprising a filter assembly coupled to the pump and configured to filter the water before the water passes into the piping assembly.

7. The apparatus of claim 1, further comprising a gauge to indicate the pressure within the piping assembly.

8. The apparatus of claim 1, wherein the piping assembly includes a pressure tank to stabilize the pressure within the piping assembly.

9. The apparatus of claim 1, wherein the appliance connector is selected from the group consisting of a washing machine water connector, a dishwasher connector, a dryer connector, an ice machine, and a refrigerator water connector.

10. The apparatus of claim 1, further comprising:
a second appliance connector coupled to the piping assembly to enable attachment of a second appliance thereto.

11. The apparatus of claim 1, further comprising:
a second pump configured to draw water from the water tank and pressurize the water within a second piping assembly; and
a second appliance connector coupled to the second piping assembly to enable attachment of a second appliance thereto.

12. The apparatus of claim 1, further comprising:
a water sprayer mounted within the water tank and configured to wash an inside of the water tank.

13. A portable appliance testing apparatus comprising:
a water tank;
a pump configured to draw water from the water tank and pressurize the water within a piping assembly;
an appliance connector coupled to the piping assembly to enable attachment of an appliance thereto;
a return access inlet to enable the receipt of return water from the appliance into the water tank;
an electrical outlet to enable electrical attachment of the appliance; and
a power breaker to provide electrical power to the electrical outlet and to prevent overcurrent at the electrical outlet.

14. The apparatus of claim 13, further comprising:
a pressure regulator switch coupled to the piping assembly to enable control of the pump based on a pressure within the piping assembly.

15. The apparatus of claim 14, further comprising:
additional appliance connectors coupled to the piping assembly to enable attachment of additional appliances thereto.

16. The apparatus of claim 15, further comprising:
a pressure tank to stabilize the pressure within the piping assembly.

17. A method for appliance testing comprising:
drawing water from a water tank with a pump and pressurizing the water within a piping assembly;
controlling the pump based on a pressure within the piping assembly with a pressure regulator switch coupled to the piping assembly;
passing the water to an appliance attached to the piping assembly via an appliance connector coupled to the piping assembly;
receiving return water from the appliance into the water tank via a return access inlet; and
passing water to a second appliance attached to the piping assembly via a second appliance connector coupled to the piping assembly.

\* \* \* \* \*